United States Patent [19]

Billings et al.

[11] Patent Number: 5,682,471
[45] Date of Patent: Oct. 28, 1997

[54] SYSTEM FOR TRANSPARENTLY STORING INPUTS TO NON-VOLATILE STORAGE AND AUTOMATICALLY RE-ENTERING THEM TO RECONSTRUCT WORK IF VOLATILE MEMORY IS LOST

[76] Inventors: Thomas Neal Billings; Marie Farrell Billings, both of 1607 High St., Alameda, Calif. 94501-1717

[21] Appl. No.: 319,059

[22] Filed: Oct. 6, 1994

[51] Int. Cl.$^6$ ............................. G01R 31/28; G06F 11/00
[52] U.S. Cl. ............................. 395/182.13; 395/182.14; 395/489
[58] Field of Search ............................. 395/181, 182.13, 395/182.12, 182.14, 182.16, 489

[56] References Cited

U.S. PATENT DOCUMENTS

| | | | |
|---|---|---|---|
| 3,533,082 | 10/1970 | Schnabel | 395/182.14 |
| 4,145,761 | 3/1979 | Gunter | 365/227 |
| 4,307,455 | 12/1981 | Juhasz | 364/900 |
| 4,327,410 | 4/1982 | Patel | 364/200 |
| 4,458,307 | 7/1984 | McAnlis | 364/200 |
| 4,503,494 | 3/1985 | Hamilton | 364/200 |
| 4,525,800 | 7/1985 | Hamerla | 364/900 |
| 4,566,063 | 1/1986 | Zolnowsky | 364/200 |
| 4,603,406 | 7/1986 | Miyazaki | 365/229 |
| 4,611,289 | 9/1986 | Coppola | 364/492 |
| 4,654,819 | 3/1987 | Stiffler | 364/900 |
| 4,703,481 | 10/1987 | Fremont | 371/12 |
| 4,757,505 | 7/1988 | Marrinton | 371/66 |
| 4,812,677 | 3/1989 | Perry | 307/296 R |
| 4,907,150 | 3/1990 | Arroyo | 364/200 |
| 4,959,774 | 9/1990 | Davis | 364/200 |
| 5,008,936 | 4/1991 | Hamilton | 380/50 |
| 5,029,093 | 7/1991 | Wiener | 364/464.02 |
| 5,086,502 | 2/1992 | Malcolm | 395/182.06 |
| 5,159,597 | 10/1992 | Monahan | 371/16.1 |
| 5,175,847 | 12/1992 | Mellott | 395/575 |
| 5,193,176 | 3/1993 | Brandin | 395/575 |
| 5,204,840 | 4/1993 | Mazur | 365/228 |
| 5,212,784 | 5/1993 | Sparks | 395/182.04 |
| 5,369,757 | 11/1994 | Spiro | 395/182.17 |
| 5,379,417 | 1/1995 | Lui | 395/575 |
| 5,426,774 | 6/1995 | Banerjee | 395/182.14 |
| 5,428,618 | 6/1995 | Ueki | 395/182.14 X |
| 5,488,731 | 1/1996 | Mendelsohn | 395/800 |

OTHER PUBLICATIONS

Baseline Publishing Inc., Thunder 7, 1993, Data Sheet.
Borland International, Inc., Sidekick, 1994, pp. 20–21.

*Primary Examiner*—Robert W. Beausoliel, Jr.
*Assistant Examiner*—Glenn Snyder
*Attorney, Agent, or Firm*—David Pressman

[57] ABSTRACT

A system for preventing permanent loss of work product from a volatile memory (30) of an information processing device (12) when such work is temporarily lost, erased, or corrupted owing to power failure, equipment malfunction, operator error, or other misadventure. When the information processing device (12) is turned on, the system is automatically loaded from a non-volatile memory (44) into a volatile memory (14) where it then resides (block 32). The system thereafter causes every substantive input (including data, positional information, and data formatting and manipulating instructions, but not ancillary inputs such as a view directory or print command) to the information processing device (12) to be stored immediately, and essentially quantum by quantum, in the non-volatile memory (44) concurrently with its initial processing in the volatile memory (14). When work is lost from the volatile memory (14), the system reconstructs it either automatically or semi-automatically, as selected by the operator. In the reconstruction process, the system retrieves inputs previously stored in the non-volatile memory (44) and re-enters them, with appropriate timing, into the information processing device (12) for re-processing as if they were being entered all over again manually. By this method, the system reconstructs temporarily lost work substantially as it existed at the instant it was lost, and the system thereby prevents permanent loss of such work automatically, easily, completely, and reliably.

22 Claims, 5 Drawing Sheets

SYSTEM FOR TRANSPARENTLY STORING INPUTS TO NON-VOLATILE STORAGE AND AUTOMATICALLY RE-ENTERING THEM TO RECONSTRUCT WORK IF VOLATILE MEMORY IS LOST

BACKGROUND

1. Field of Invention

This invention relates to information processing devices, specifically to a system for preventing permanent loss of unsaved work product from the volatile memory of an information processing device.

2. Prior Art

Loss of work in information processing devices (computers) has long been a serious problem, and many attempts have been made to solve it. However, none of the solutions to the problem proposed heretofore has actually been successful in preventing such losses.

Such work resides in volatile, read-and-write, Random Access Memory ("RAM") which is automatically erased if power fails. Work in the RAM can also be lost or corrupted through equipment malfunction, operator error, and other misadventure.

Power failure can obviously result from interruption of power normally furnished, for example, by an electric power utility company, or from a transient fluctuation or "spike" in such normal power supply. Power failure can also result, for example, from accidental disconnection of a computer from its power supply, or simply from shutting off a computer inadvertently.

Equipment malfunction can result from a wide range of electrical or mechanical anomalies or from arcane flaws or "bugs" in software. An example of equipment malfunction is the unexpected failure of the keyboard to respond, requiring restarting the computer with consequent loss of work. A bug is any undocumented feature in a software program that causes a computer to behave in an unexpected and undesired way.

Operator errors include, for example, entry of a destructive but unintended command such as "delete". Operator errors may also include entry of a keystroke sequence, mouse movement or other input ("input", "stroke", or "keystroke") which has an unintended destructive effect such as exiting from an application without first saving the work, in consequence of which the work is lost.

Other misadventures include, for example, occasional accidental erasure of the RAM caused by unexpected, transient or ambient static electricity in a computer's environment.

Once work is lost from the RAM for any reason, it normally cannot be recovered. On the other hand, work which has been saved to non-volatile memory, of which a floppy disk or hard disk ("disk") or tape are common examples, can often be recovered, at least in part, with the aid of appropriate software even if it is seemingly lost when the RAM is unintentionally erased.

Therefore, when work is lost from the RAM, the result is typically loss of the time and effort of the operator and may also result in the irretrievable loss of the operator's creative ideas. Obviously, such losses can have catastrophic consequences, often for many others as well as the operator.

Traditional methods of dealing with the problem of lost work have not even attempted to actually solve it. Rather, they have attempted merely to ameliorate its effects by reducing the risk that a loss will occur or the amount of work that will be lost when such a loss does occur.

The classic response, but not a solution, to the problem of lost work is to save the work frequently to disk. By manually invoking the save process with a save command, the operator causes the computer to copy the current, up-to-the-instant version of the work from the RAM to disk. While such saving limits potential losses of work to any inputs entered since the most recent save was executed, often the amount or the value of work remaining at risk of loss in spite of frequent saves can be great.

Thus, even when saving is frequent, it is incapable of protecting any of the additions, deletions, modifications, or other effects of unsaved inputs contributed since the most recent save. Moreover, rigorous, frequent saving is rarely practiced because saving is disruptive to the operator and, in and of itself, takes time. For those reasons, many operators choose to save only infrequently, if at all. In addition, it is easy for even a conscientious operator to forget to save, especially when engrossed in highly creative work.

At best, then, while saving may reduce the amount of lost work, it does not actually solve the problem, and the saving approach is unreliable because it provides no protection at all unless the operator faithfully and diligently remembers to save, and then actually does so.

Heretofore, several alternatives to the saving approach have been employed. Some have been hardware based, others operationally oriented. In both cases, the drawbacks have tended to offset the advantages.

The simplest alternative involves automatic saving. Here, the computer itself initiates the saving process automatically at regular intervals based on the passage of time, or the amount of input entered. While this alternative may solve the problem of the forgetful operator, it remains flawed. The effects of all inputs entered since the most recent save continue to remain in jeopardy, and the now arbitrary operation of the saving process can be highly disruptive to the operator's concentration and train of thought. This alternative has not proved popular and has not been widely applied.

Another widely adopted alternative involves the use of non-interruptable power supplies which are configured in various ways. For example, the computer may draw its power continuously from a battery which, in turn, is continuously recharged via connection to an external power source. Many laptop computers operate in this manner in one of their normal modes.

Standby power supplies employ a circuit to detect any power failure and then instantaneously switch to an alternative (usually battery) power supply, thereby enabling the computer to continue to run long enough for it to be shutdown in an orderly manner without loss of work from the RAM. The following U.S. patents essentially cover variations of this technique: U.S. Pat. No. 4,145,761 to Gunter et al. (1979); U.S. Pat. No. 4,307,455 to Juhasz et al. (1981); U.S. Pat. No. 4,458,307 to McAnlis et al. (1984); U.S. Pat. No. 4,503,494 to Hamilton et al. (1985); U.S. Pat. No. 4,611,289 to Coppola (1986); U.S. Pat. No. 4,757,505 to Marrington et al. (1986); U.S. Pat. No. 4,907,150 to Arroyo et al. (1990); U.S. Pat. No. 4,959,774 to Davis (1990); U.S. Pat. No. 5,175,847 to Mellott (1992); U.S. Pat. No. 5,193,176 to Brandin (1993); and U.S. Pat. No. 5,204,840 to Mazur (1993).

All of the variations disclosed in these patents suffer from the same three defects. First, they require a secondary power supply of some type, and that increases both complexity and cost. Second, they rely on circuitry to respond instantaneously and appropriately to occasional power loss situations, but these are not entirely reliable. Third, they do not even attempt to preserve work from loss owing to causes other than disruption of the power supply.

Specifically, these solutions make no attempt to deal with the three other common causes of lost work: equipment malfunction, operator error, and other misadventures, explained above.

Others have suggested solutions involving special augmentation of normal computer hardware to provide redundant storage to improve the fault tolerance characteristics of the system. The following U.S. patents exemplify this approach: U.S. Pat. No. 4,525,800 to Hamerla (1985) and U.S. Pat. No. 4,327,410 to Patel et al. (1982). Like the patents cited above, these approaches require extra hardware and therefore extra cost, and they address only the issue of power disruption to the exclusion of equipment malfunction, operator error, or other misadventure.

Some software, of which a word processor from Microsoft Corporation, sold under the trademark MICROSOFT WORD is an example, provide a mechanism for reminding the operator that work should be saved at intervals selected by the operator. At best, this approach only works to the extent that the operator complies with the reminders. In any event, it affords no protection for inputs entered between reminders, and it interrupts the operator's work flow on a periodic, annoying basis.

Other software, of which a list maintenance product from Borland International Inc., sold under the trademark SIDE-KICK is an example, claim to provide an application-specific shadow memory feature which can limit the amount of work lost in the event of a power failure or system crash. Each of the brief, discrete, highly structured entry items that it accommodates is saved to disk automatically as it is generated, so an entire session of ostensibly unsaved items can be recovered in the event of a mishap. In fact, however, this feature is merely a variation on automatic saving discussed above. It appears not to disrupt the operator because its saves are overlapped with display operations which are necessary to refresh the screen between each brief item entry. Only text needs to be saved in such applications because the format of each brief, structured entry is always implicit within the entry itself. However, no keystrokes are saved until an item being entered is complete and, of course, such shadow memory features are unique to their native applications and cannot be extended for use with other applications.

An interactive spelling, thesaurus, and shorthand glossary software product from Baseline Publishing, Inc., sold under the trademark THUNDER 7, includes a module, trademarked GHOSTWRITER, which can save text keystrokes to disk files as they are entered, and such files can assist in partially recovering lost work. This product has several drawbacks. It is dependent upon the specific attributes of Apple Macintosh computers and has no general application. It saves only text and retains no positional information or formatting or manipulating instructions as, for example, from cursor keystrokes or mouse movements. Such non-text information is important in word processing applications, and it is essential, not merely important, to most non-word-processing applications such as spreadsheets, data bases, personal productivity, accounting, graphics, publishing, presentations, and the like.

Thus, when keystrokes saved by GHOSTWRITER are read from disk, they appear arbitrarily in the order in which they were entered, rather than in the places where they belong. For example, all keystrokes inserted to edit a document appear all together, not in the places in the document in which they were originally inserted, and without any information to guide the operator in properly reinserting them manually. Also, when displayed, the saved text keystrokes are interspersed with numerous square symbols, which represent formatting commands that are not implemented in the GHOSTWRITER system. Such extraneous symbols greatly obfuscate any information content of the saved keystrokes. Therefore, if recovery of work based on a GHOSTWRITER file is possible at all, the process usually requires a significant amount of time and labor by the operator.

Thus, despite all previous efforts to solve it, the fundamental problem remains: work on computers is permanently lost every day, especially on the vast majority of smaller, lower-budget, individual computer systems, because of power failures, equipment malfunctions, operator errors, and other misadventures.

OBJECTS AND ADVANTAGES OF INVENTION

Accordingly, several objects and advantages of the system of the present invention ("system") include the following:

1. It obviates potentially catastrophic consequences of permanent loss of unsaved work on computers owing to power failure, equipment malfunction, operator error, or any other type of misadventure.

2. It preserves unsaved work on computers which is at risk of permanent loss by virtue of residing in the RAM from such permanent loss in consequence of power failure, equipment malfunction, operator error, or any other type of misadventure.

3. It precludes loss of time, effort, and creative ideas of computer operators which would otherwise result from permanent loss of unsaved work on a computer owing to power failure, equipment malfunction, operator error, or any other type of misadventure.

4. It preserves unsaved work on a computer economically by accepting that occasional losses are inevitable and, therefore, avoiding costly means for attempting to prevent such losses absolutely.

5. It prevents the permanent loss of unsaved work on a computer by providing an economical and automatic method for reconstructing any such work if it is lost.

6. It provides a method of continuously storing, by ordinary means, all inputs which create all aspects of work including text, numeric, and other character and symbol-based content and substance; format, design, and other visual and graphic-based content and substance; auditory, tactile, olfactory, and other sensory stimuli and/or cues; movement and positional information related to cursor, mouse, and other input devices; and any special input timing information; and it thereby obviates any need for an auxiliary power supply or for any extraordinary protective measures to be initiated in the event of power failure, equipment malfunction, operator error, or other misadventure.

7. It provides a method of storing each and every such material input by ordinary means as it is entered so that preservation of work does not require a secondary power supply or any other additional equipment, component, or facility.

8. It provides a method for effectively protecting work on computers without time-consuming conventional saving involving the copying of the entire work as it resides in the RAM to disk.

9. It provides a method, without a requirement for operator participation or intervention, for reconstructing work in a computer automatically, completely, and precisely when it is temporarily lost owing to power failure, equipment malfunction, operator error, or other misadventure.

10. It provides a reliable method for preserving and protecting work on computers without the risks of error or omission associated with reliance upon the operator to save such work to disk from time to time.

11. Lastly, it provides a method for preserving and protecting work on a computer without the disruption to the operator occasioned by saving such work to disk from time to time whether such saving process is initiated automatically or at the discretion of the operator.

In addition, the system of the present invention includes the following further objects and advantages:

12. It provides a method for automatically reconstructing work on a computer even when the work is temporarily lost owing to shut down of the computer, intentional or otherwise, without first saving the work in the conventional manner.

13. It provides a method for preserving and protecting work on a computer without saving the work in and of itself to disk but by storing, instead, only the inputs that gave rise to the work as they were entered into the computer.

14. It provides, in furtherance of the above, a method for operating non-volatile memory of a computer in such a way that a portion of volatile memory can be copied to it without discernible delay.

15. It provides a method of operating a computer such that all inputs which are applied in the RAM and thereby affect work, and are also stored to disk essentially simultaneously so that any work lost from the RAM at any time can be reconstructed readily, automatically, and precisely from inputs stored on disk.

16. Lastly, it provides a method for transferring computer inputs to disk on a continuing basis but, in each instance, so quickly the operator experiences no discernible disruption.

Still further objects and advantages of the system will become apparent from consideration of the drawings and the ensuing description.

DRAWINGS

Figure 1:
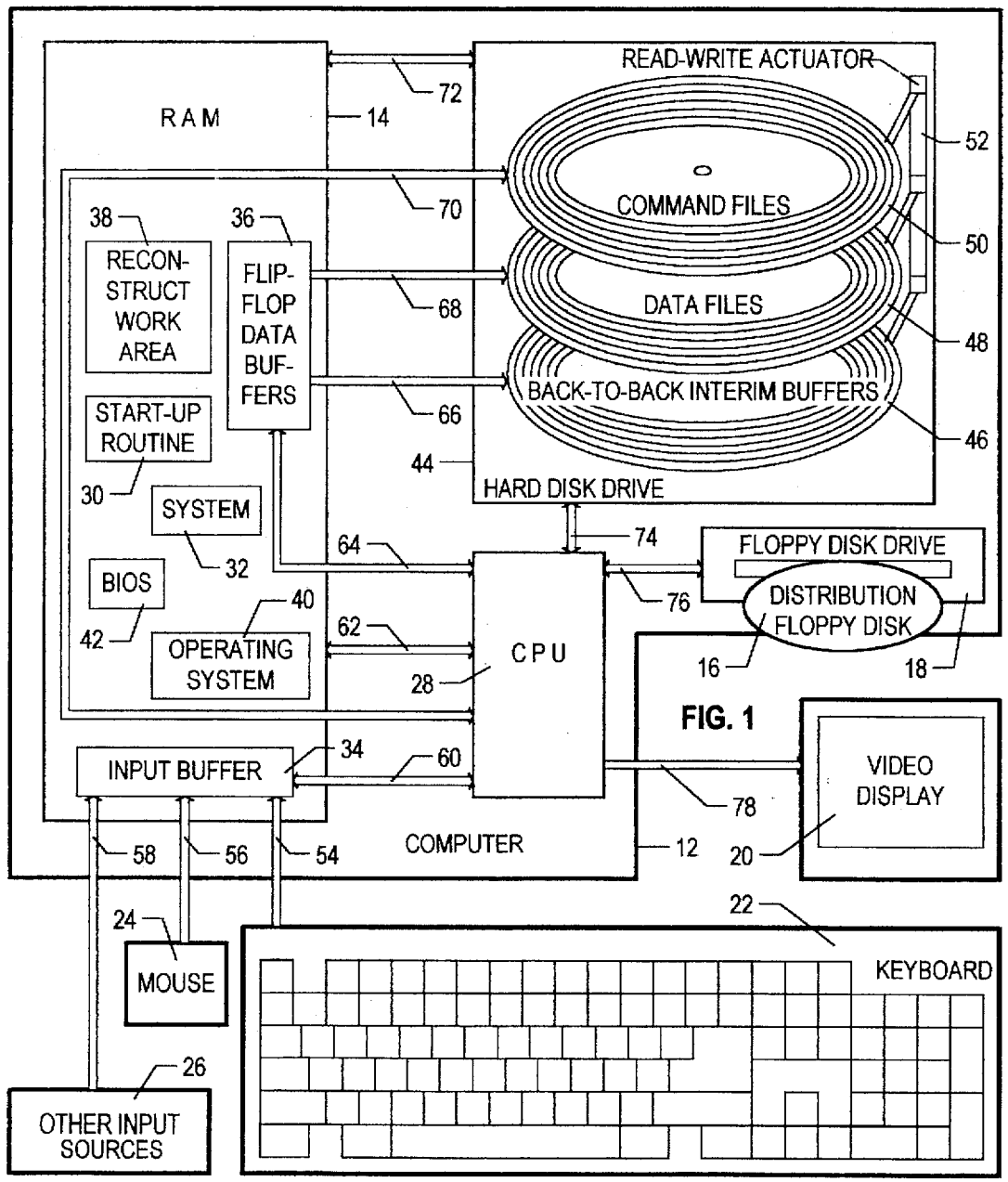
FIG. 1 is a schematic diagram showing the essential elements of an idealized information processing device (computer) on which the system of the present invention resides.

Reference Numbers in Drawings Functional Hardware and Software Elements (not to any scale) :

| 12 | Information processing system or device or "computer" |
| 14 | Volatile memory or volatile memory device "RAM" |
| 16 | System distribution medium or "floppy disk" |
| 18 | Device for installing the system or "floppy disk drive" |
| 20 | Monitoring device or "video display" |

-continued

| 22 | Primary input source, or manual input device "keyboard" |
| 24 | Auxiliary input source or manual input device display-screen-pointer or "mouse" |
| 26 | Other input sources or inputs devices including a "modem", "network", "scanner", "touch screen", etc. |
| 28 | Processing device or central processing unit or "CPU" |
| 30 | Start-up routine when residing in RAM |
| 32 | System of the present invention or "system" when resident in RAM |
| 34 | Input buffer area designated in RAM or "input buffer" |
| 36 | Flip-flop data buffer area designated in RAM or accumulating buffers "data buffers" |
| 38 | Reconstruct working area designated in RAM or "reconstruct area" |
| 40 | Computer operating system when resident in RAM |
| 42 | Basic input-output system or "BIOS" when resident in RAM |
| 44 | Non-volatile memory or "disk". |
| 46 | Back-to-back interim buffers or "interim buffers" or counterpart buffer arrays on disk |
| 48 | Data stroke files or "data files" on disk |
| 50 | Command stroke files or "command files" on disk |
| 52 | Disk read-write actuator mechanism and heads or, collectively, "actuator" |

Conceptual signal flows:

| 54 | From keyboard 22 to input buffer 34 |
| 56 | From mouse 24 to input buffer 34 |
| 58 | From other input sources 26 to input buffer 34 |
| 60 | Between input buffer 34 and CPU 28 |
| 62 | Generally, between CPU 28 and RAM 14 |
| 64 | Between CPU 28 to data buffers 36 |
| 66 | From data buffers 36 to interim buffers 46 |
| 68 | From data buffers 36 to data files 48 |
| 70 | Between CPU 28 and command files 50 |
| 72 | Generally, between RAM 14 and disk 44 |
| 74 | Generally, between CPU 28 and disk 44 |
| 76 | Generally, between CPU 28 and floppy disk drive 18 |
| 78 | Generally, from CPU 28 to video display 20 |

DESCRIPTION—SUMMARY

The present invention constitutes a system for preventing the permanent loss of work product from the volatile memory of an information processing device owing to erasure or corruption resulting from power failure, equipment malfunction, operator error, or other misadventure. The system includes a volatile memory for storing and processing information; a source of power for sustaining the volatile memory; a non-volatile memory capable of retaining information without a source of power; an input device for entering information (data) and instructions (commands); a means for storing all inputs involved in the creation of work product (application invocations, unformatted data, and instructions for formatting and manipulating data) continuously, immediately, automatically, and without discernible delay, from volatile memory to non-volatile memory; and a means for automatically re-entering all of such stored inputs from non-volatile memory to volatile memory with appropriate timing and effect such that lost work product is reconstructed automatically, and substantially as it existed just prior to being lost.

The system of the present invention effectively preserves work created in the volatile memory by doing two things. First, it stores to non-volatile memory from volatile memory copies of all of the inputs that create the work, and it does so automatically, continuously, completely, reliably, and without disrupting the operator. Then, it re-applies such stored inputs so as to recreate the lost work substantially as it existed at the instant it was lost, and it does so automatically, quickly, reliably, and responsively to the preferences of the operator.

The system employs two counterpart pairs of buffers, one pair in volatile memory (RAM) and the other pair in non-volatile memory (disk). Each of the pair of RAM buffers has the same storage capacity as a single disk storage cluster. Each of the pair of disk buffers occupies a complete disk track and, therefore, comprises a number of such storage clusters. The disk buffers are situated on the same disk cylinder so that the read-write actuator can access both of them simultaneously, and the system causes the actuator to default to such simultaneous-access position, thereby eliminating track-seek-delay from buffer operation.

As inputs are accumulated in one of the RAM buffers, its growing contents are copied frequently to its counterpart disk buffer, and always to the cluster which is most immediately accessible, thereby eliminating cluster-seek-delay from buffer operation. When either buffer set (a RAM buffer and its disk counterpart) becomes full, the input accumulating function is switched to the alternate buffer set. Then, as soon as the actuator can be freed for the purpose without impairing real-time input storage and without discernible interruption to the operator, the contents of the full RAM buffer are stored to a permanent location on disk.

Once the content of a buffer set has been permanently stored, the buffers can be purged in preparation for their next accumulating session. The only significant cluster in the disk buffer is the one most recently written, and it is always the one which is most nearly full. That is the cluster which, if work is lost, safely stores the very last inputs entered before the work is lost.

Figure 4:
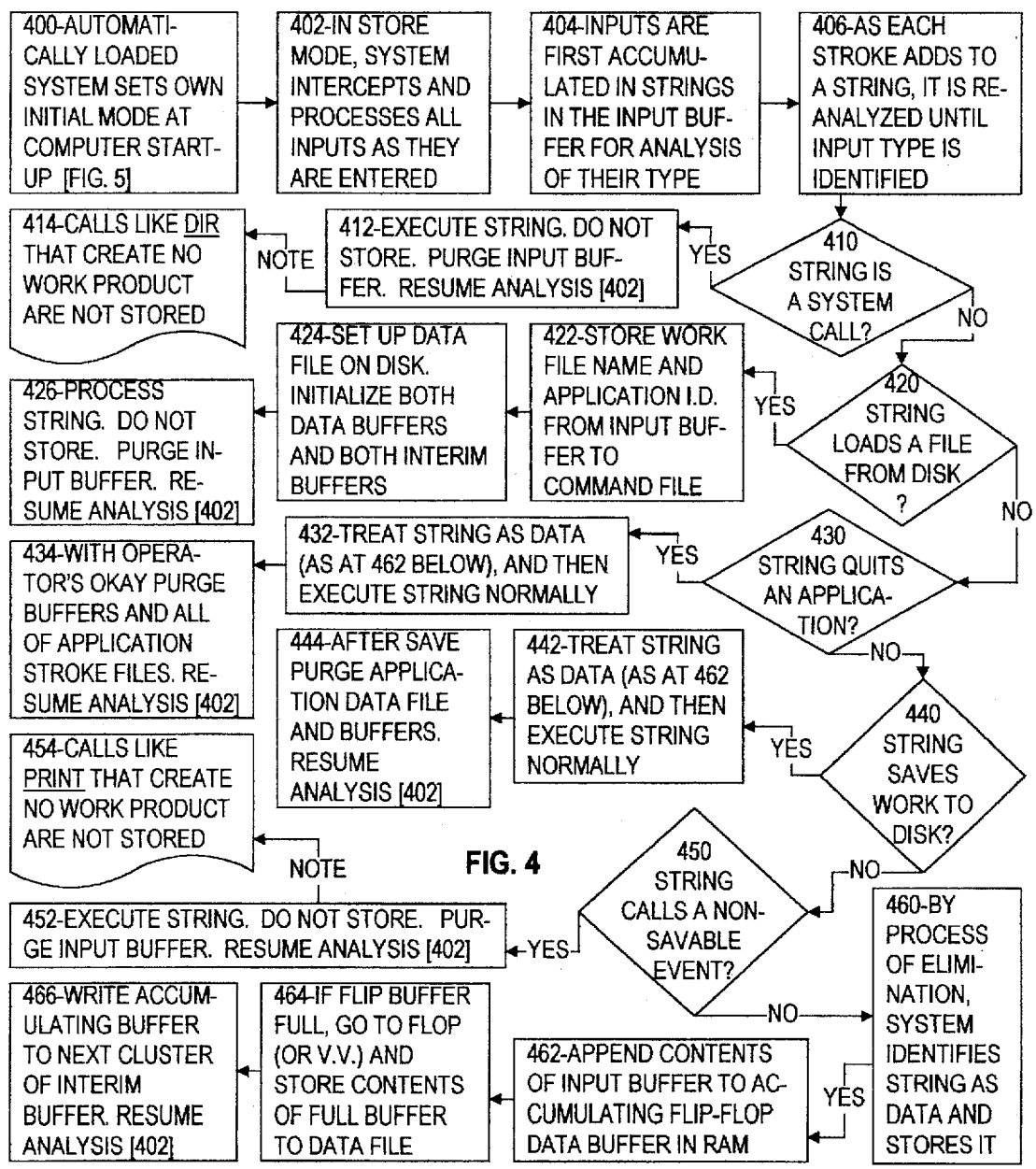
FIG. 4 is a flowchart showing operation of the system of the present invention in its store mode.
Figure 5:
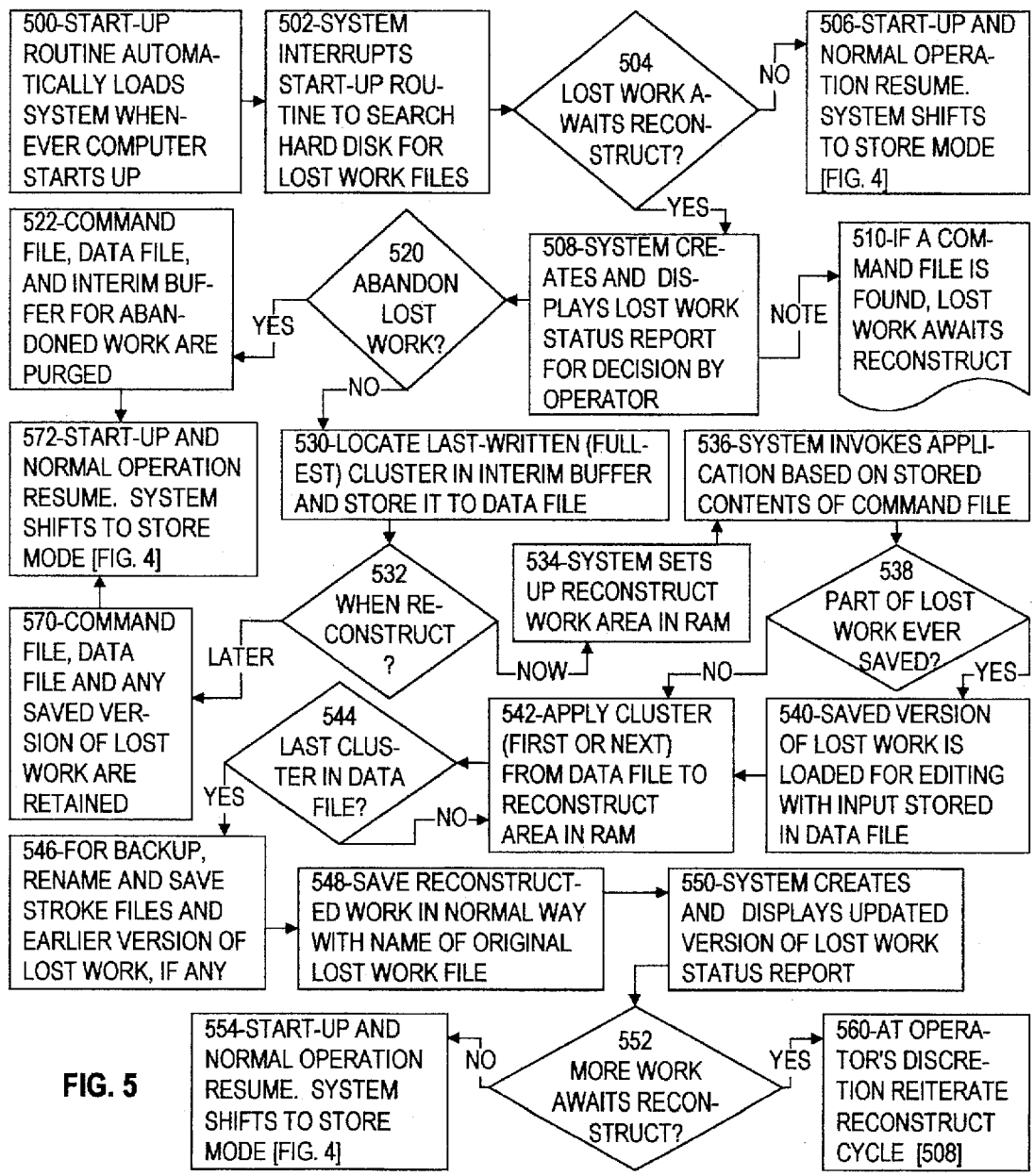
FIG. 5 is a flowchart showing operation of the system of the present invention in its reconstruct mode.

There follows a full description of the system including its structure (FIG. 1), its overall operation (FIG. 2), its installation (FIG. 3), its operation in store mode (FIG. 4), and its operation in reconstruct mode (FIG. 5).

Description—FIG. 1 (System Schematic)

FIG. 1 depicts a typical embodiment of the system in an idealized information processing device, or computer.

This diagram shows essential hardware components of a computer, notional locations within the computer occupied by essential components of the system and other software, and also conceptual signal flows among them.

In the initially preferred embodiment of the system, the exemplary configuration comprises a computer 12, a keyboard input device 22, a mouse input device 24, other input devices 26 (modem, network, scanner, etc.), a central processing unit (CPU) 28, a volatile memory (RAM) 14, a non-volatile memory device (disk) 44 utilizing non-removable media, a second non-volatile memory device (floppy disk drive) 18 utilizing removable media, a system distribution item of removable media (floppy disk) 16, and a monitoring device (video display) 20.

Input devices 22, 24, and 26 are associated with CPU 28 via input buffer 34 which is a designated area in RAM 14. The system resides in another designated area 32 of RAM 14. Additional designated areas of RAM 14 accommodate a start-up routine 30, a pair of flip-flop data buffers 36, a reconstruct work area 38, an operating system 40, and a BIOS 42. A BIOS or basic-input-output-system is software that expedites transfer of information between the CPU and the computer's input devices, output devices, and storage devices.

Disk 44 comprises a set of flat, circular "platters" (46, 48, and 50) each having a magnetic coating on both surfaces. A series of invisible concentric "tracks" is placed or "written" magnetically on each surface, and each set of counterpart tracks on all surfaces is said to reside on the same imaginary "cylinder." Actuator 52 is provided with one read-write head per surface so that all tracks on a given cylinder are always accessed simultaneously.

One pair of tracks on the same cylinder is dedicated for use as interim buffers 46. These buffers serve as counterparts on disk 44 to data buffers 36 in RAM 14. Another track, preferably on the same cylinder, is dedicated for use as a command file 50, and one or more tracks are designated for use as data files 48. Although interim buffers 46 and data file 48 and command file 50 are depicted for clarity as residing on three different platters within disk 44, it is possible for all three to reside on a single platter.

Typically, the track accommodating the first of interim buffers 46 is situated on the obverse surface of a given platter, and the track accommodating the second of interim buffers 46 is situated on the reverse surface of the same platter. Both of the tracks are situated on the same cylinder, and the read-write actuator 52 is directed to default to that cylinder when not otherwise engaged.

In a disk with multiple platters, read-write actuator 52 may be similarly associated with the tracks dedicated for use as command file 50 and with tracks used for data files 48 by locating those files on the same cylinder as interim buffers 46. Although actuator 52 is depicted for clarity with three separate read-write heads, it is equally possible for a single read-write head to perform the functions of all three devices in a disk without multiple platters.

As indicated in FIG. 1, signals flow in computer 12 along well-known conceptual paths. Input signals from keyboard 22, mouse 24 and other input sources 26 initially flow to input buffer 34 following paths 54, 56 and 58 respectively. From input buffer 34, in which they are accumulated into meaningful strings, inputs then flow to CPU 28 following path 60.

In general, signals flow back and forth between CPU 28 and RAM 14 following path 62. Data signals flowing between CPU 28 and data buffers 36 follow path 64. Data signals then flow from data buffers 36 to counterpart interim buffers 46 following path 66, and from data buffers 36 directly to data files 48 following path 68. Command signals destined for command files 50 flow directly there from CPU 28 following path 70. In these ways, all substantive inputs to computer 12 are stored in non-volatile memory 44 as they are entered.

When performing normal operations, such as install and reconstruct, the computer 12 requires a multitude of signals to travel among its components and peripheral devices. In general, signals between RAM 14 and disk 44 follow path 72 while signals between CPU 28 and disk 44 or floppy disk drive 18 follow paths 74 or 76 respectively. Signals activating video display 20 follow path 78 from CPU 28.

Figure 2:
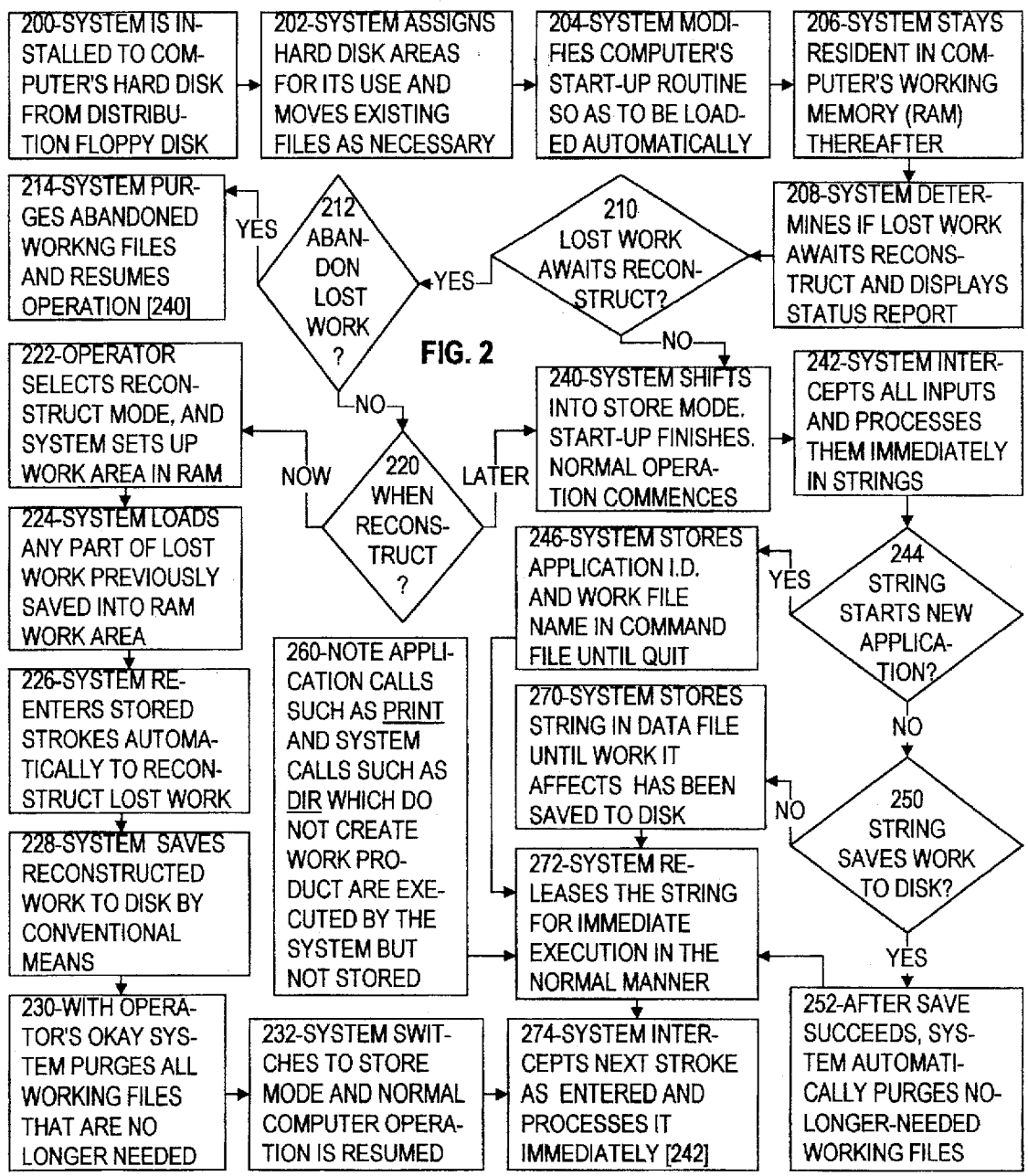
FIG. 2 is a flowchart showing a functional overview of the system of the present invention.

Operation—FIG. 2 (System Overview)

FIG. 2 is a flowchart that shows an operational overview of the system.

Figure 3:
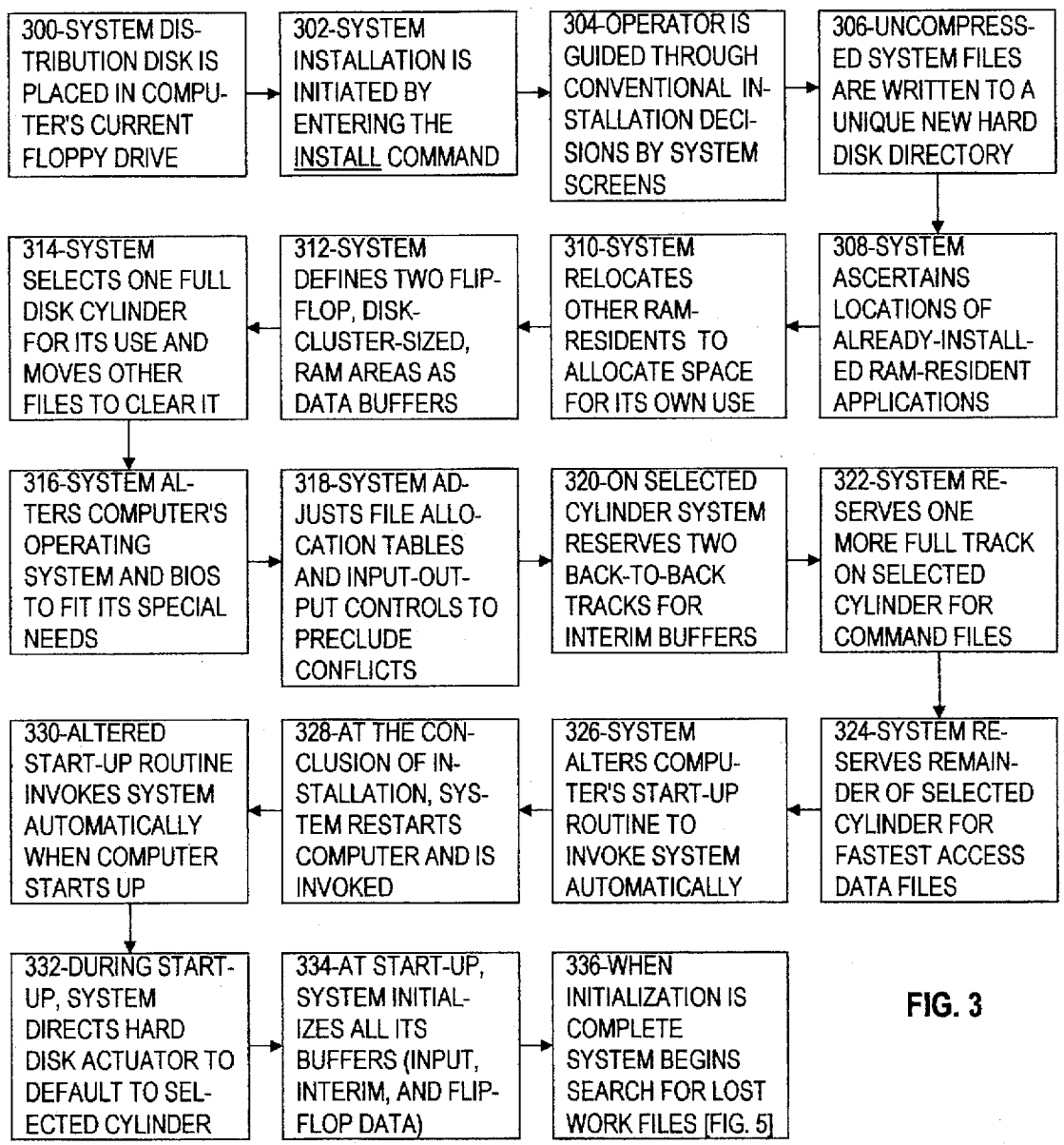
FIG. 3 is a flowchart showing installation and initialization of the system of the present invention.

The system of the invention normally will be sold as a software product either for installation in an existing computer or for packaging with a new operating system for either a new or existing computer. The operations and steps shown in FIG. 2, as well as FIGS. 3 to 5, are implemented in a software program, or "code", which can be written readily by a programmer skilled in writing operating system software.

The system for storing inputs to computer 12 as they are entered and for later using them to reconstruct lost work comprises three primary modules plus utilities. The modules are written in a conventional manner for contemporary computer application programs, both as to functionality and also as to user interface. The modules comprise an installation and initialization module (FIG. 3); a store mode module (FIG. 4); and a reconstruct mode module (FIG. 5). The modules are supported with a set of housekeeping utilities which serve conventional purposes and are written in conventional manner. The utilities are not of the essence of the system and, therefore, are not described further.

As indicated in FIG. 2, the system is installed to disk 44 in a conventional way from floppy distribution disk 16 (block 200). During installation, the system surveys disk 44, reserves areas for its own use, and relocates existing files it finds to non-conflicting locations, as necessary (block 202). The system also modifies start-up routine 30 so that the system will be automatically loaded and invoked whenever computer 12 is started up (block 204). Once loaded and invoked, the system stays resident in RAM 14 (block 206), as indicated in block 32 (FIG. 1).

Immediately after it is loaded and invoked during start-up, the system conducts a search for stored inputs (block 208) signifying lost work is awaiting reconstruction (block 210). If no lost work is found, the system switches to its store mode and returns control of computer 12 to start-up routine 30, and normal operation is resumed (block 240). If the system finds indications that any unsaved work has been lost and not yet reconstructed, the system creates and displays a status report for the operator (block 208).

The operator may then choose to abandon the lost work or to retain it (block 212). The decision is communicated to the system via a dialog box imbedded in the status report screen on video display 20. If the operator chooses to abandon the lost work, the system purges relevant command file 50 and data file 48 and then returns control of computer 12 to start-up routine 30 (block 214). If the operator chooses to retain the lost work, that decision, and also the decision whether to reconstruct "now" or "later" is also communicated to the system via a dialog box imbedded in the status report screen (block 220).

If the operator elects to reconstruct immediately and communicates that decision to the system via the dialog box imbedded in the status report display screen, the system switches to its reconstruct mode, as shown in FIG. 5, and sets up a reconstruct work area 38 in RAM 14 (block 222). The system then determines whether any earlier, partial version of the lost work was saved and, if so, it is loaded into reconstruct area 38 of RAM 14 (block 224). The system then applies the strokes it stored earlier either to re-edit such earlier version or to again build the work from scratch just as the original manual strokes did before the work was lost (block 226).

When reconstruction is completed in the mode selected by the operator, the system saves the reconstructed work to disk 44 in the conventional way (block 228). With confirmation from the operator that it is okay to do so, the system next purges all of its working files and areas (block 230), and the system then switches to store mode (block 232), as shown in FIG. 4, and restores computer 12 to normal operation (block 274).

If the operator elects to defer reconstruction, or if no lost work is awaiting reconstruction, the system switches automatically to its store mode (block 240). In store mode, the system intercepts all inputs as they are entered and accumulates them in input buffer 34 in strings of varying length (block 242). As each successive character is appended, the system re-assesses the growing string until its composite significance can be deduced, and its appropriate disposition thereby determined. At that point, the string is released for immediate execution in the normal manner (block 272), and accumulation of the next string is commenced (block 242).

If a string invokes an application (block 244), the system stores its identity and the name of any related working file to command file 50 on disk 44 (block 246). If a string saves work to disk (block 250), the string is stored as if it were data until the save has been executed. After the save has been executed, the string is purged along with any other no-longer-needed system files (block 252).

Most strings are data strings (block 270), although in fact their content may be text, numerical data, formatting or manipulating instructions, positional information, or any other type of input that contributes to the actual creation of work. By its own processes, the system stores all such strings to data file 48 on disk until after the work reflecting their effects has been saved to disk 44. Once such save has occurred, however, there is no further need to preserve the underlying inputs, and the system purges data files 48.

When the operator quits an application intentionally after successfully saving the related work to disk, the system also purges command file 50 (block 246). The entire store process is then reiterated.

Certain input strings, such as print or directory commands, call upon computer 12 to perform operations that do not actually participate in the creation of work. The system passes such strings along to CPU 28 for immediate execution, but does not store them (block 260).

When special handling of each string by the system is complete, the system releases the string for immediate execution in the normal manner (block 272), and then repeats the store mode process (block 274).

Operation—FIG. 3 (Details of Installation and Initialization)

FIG. 3 is a flowchart that shows how the system is installed and initialized, and thereby made ready to operate.

When the system is initially installed in computer 12, a floppy distribution disk 16 containing the system is inserted into floppy disk drive 18 (block 300). The operator then enters an install command (block 302) which causes the contents of the distribution disk to be uncompressed and transferred under control of CPU 28, and also as the operator directs (block 304), to a permanent storage location on disk 44 (block 306). During installation, the system presents questions and choices to the operator via display screen 20, and the operator responds and directs the system via keyboard 22 or mouse 24.

As part of the installation process, the system ascertains locations already occupied by other RAM-resident programs (block 308). The system then relocates such programs if necessary to reserve areas of RAM 14 and disk 44 for its own use (block 310).

The system designates two identical areas of RAM to serve as flip-flop data buffers 36, both configured to be the same size as the disk clusters to which their contents are to be stored (block 312). Although a cluster normally comprises two or more adjacent disk sectors, for the system's purposes, each cluster may comprise only one sector. The computer's operating system 40 and basic input-output system (BIOS) 42 are modified accordingly (block 316), as are the computer's file allocation tables and input-output controller protocols (block 318).

The system selects one full disk cylinder for its own use and relocates any files it finds in conflicting locations (block 314).

On the selected cylinder, the system reserves two complete back-to-back tracks to serve as interim buffers (46), the counterparts on disk 44 of flip-top data buffers 36 in RAM 14 (block 320). The system reserves one more full track on the same cylinder to serve as command file 50 (block 322), and the system reserves the remainder of the same cylinder to serve as fastest-access data files 48 (block 324). Additional, slower-access data files are situated on other cylinders.

Also during installation, the system modifies the computer's start-up routine 30 to load and invoke the system automatically whenever computer 12 is started (block 326). At the conclusion of the installation process, the system restarts computer 12 and is automatically loaded and invoked by start-up routine 30 (block 328). Thereafter, whenever computer 12 starts up, start-up routine 30 automatically loads the system from its permanent storage location on disk 44 to operational location 32 in RAM 14 where it remains resident and active at all times while computer 12 is in operation (block 330).

As soon as it is loaded, the system takes temporary control of computer 12. After directing disk read-write actuator 52 to default to the designated cylinder (block 332) and initializing all of its buffers (block 334), the system initiates a search for lost work that is awaiting reconstruction (block 336) as shown in FIG. 5. If no lost work is found, the system switches to its store mode as shown in FIG. 4 and returns control of computer 12 to start-up routine 30 to complete initiation of normal computer operation.

Operation—FIG. 4 (Details of Store Mode)

FIG. 4 is a flowchart that shows the operation of the system in its store mode. In this mode, the system stores all substantive inputs as they are entered, and it thereby keeps them available for automatic re-entry if needed to reconstruct work that is lost.

When start-up routine 30 of computer 12 loads the system to RAM-resident location 32 (block 400), the system defaults to its store mode unless lost work is found awaiting reconstruction (block 402) as shown in FIG. 5.

In store mode, as each stroke is entered to computer 12 from keyboard 22, computer mouse 24, or modem, network, scanner, or other input source 26, it is placed in input buffer 34 (block 404) where it is appended to any string of strokes already present in input buffer 34. The system thereupon evaluates the newly augmented contents of input buffer 34 to determine what disposition to make of the contents (block 406). Typically, the evaluation becomes finally determinable either when the most recent stroke is found to be an "enter" command, or input buffer 34 approaches a full condition.

The evaluation is accomplished by comparing the current contents of input buffer 34 with standard patterns of strokes which invoke explicit responses in computer 12, as conditioned by its resident operating system or the currently invoked application. Such patterns, some of which may be compiled in the system's own library, may also be determined by the system's examination of existing directory, system, and application files which are co-resident in computer 12.

The direction given to computer 12 by the system depends upon the outcome of its evaluation of the character string accumulated in input buffer 34:

If the system determines that the string in input buffer 34 is a system call (block 410) such as directory or "dir" instructing the computer to show a listing on video display 20 of the files on a designated disk drive (block 414), the system then releases the string for immediate execution, purges input buffer 34 (block 412), and directs computer 12 to continue its operation without storing anything from input buffer 34 to disk 44 (block 402).

If the system determines that the string in input buffer 34 is either the invocation of an application or the name of a file to be processed by such application (block 420), the system stores the string directly to command file 50 on disk 44 (block 422). It then sets up a new, related data file 48 on disk 44, and it initializes data buffers 36 in RAM 14 and interim buffers 46 on disk 44 (block 424). The system then releases the string for immediate execution, purges input buffer 34 (block 426), and directs computer 12 to continue its operation (block 402).

If the system determines that the string in input buffer 34 is a command to quit an application which is currently controlling the operation of computer 12 (block 430), the system first directs computer 12 to process the string as if it were data (block 432). When such process has been successfully completed, the system then releases the string for immediate execution (block 462). Thereafter, upon confirmation by the operator via a display screen dialog box, the system purges command file 50, data file 48, and interim buffer 46 on disk 44 (block 434). The system also purges data buffer 36 and input buffer 34 in RAM 14, and it then directs computer 12 to continue its operation (block 402).

If the system determines that the string in input buffer 34 is a command to save the current work to disk 44 (block 440), the system first directs computer 12 to process the string as if it were data and then releases the string for immediate execution (block 442). After the save has been successfully completed, the system purges data file 48 and interim buffer 46 on disk 44, purges data buffer 36 and input buffer 34 in RAM 14 (block 444), and directs computer 12 to continue its operation (block 402).

If the system determines that the string in input buffer 34 is a command within the current application which makes no substantive contribution to work product (block 450), such as "print" for example (block 454), the system releases the string (block 452) for immediate execution, purges input buffer 34, and directs computer 12 to continue its operation) without storing anything from input buffer 34 to disk 44 (block 402.

If the system determines that the string in input buffer 34 is none of the five types of strings enumerated above, the system treats the string as data by default (block 460). The system then causes the string to be appended) to the contents of currently-active data buffer 36 (block 462, causes the contents of currently active data buffer 36 to be written to the first accessible area cluster of its counterpart interim buffer 46 on disk 44 (block 466), purges input buffer 34, and directs computer 12 to continue its operation (block 402).

When either the flip or the flop data buffer 36 becomes full, or the system detects any logical discontinuity in the stream of inputs being entered to computer 12, the system switches accumulating from current (filled) buffer 36 to alternate (empty) buffer 36. Simultaneously, the system causes the contents of current (filled) buffer 36 to be stored to data file 48 on disk 44 where it is retained until a version of the work embodying the contents of data file 48 has itself been saved to disk 44 (block 464).

Once the contents of either data buffer 36 have been stored to data file 48 on disk 44 as described above, the system purges that data buffer 36 and its counterpart interim buffer 46 to ready them for their next accumulating cycle.

Whenever an additional string (comprising one or more characters) is appended to the accumulating data buffer 36, the system causes that buffer's entire contents to be written to its counterpart back-to back interim buffer 46 on disk 44. Such write is always to the first accessible cluster of counterpart interim buffer 46 and routinely overwrites previously written contents of the cluster. Thus, at any instant, the entire contents of accumulating data buffer 36 in RAM 14 are also stored in some cluster of its counterpart interim buffer 46 on disk 44.

Thus, at any instant, taking into account command file 50, data file 48, and the fullest cluster of interim buffer 46, i.e., the most recently written cluster, disk 44 contains and preserves all substantive strokes entered since the work was most recently saved. Moreover, taking into account any version of the work previously saved to disk 44, if the work were lost at any instant, by erasure or corruption from any cause, disk 44 would contain and preserve all of the elements needed to reconstruct the work automatically, quickly, easily, and substantially as it existed at the instant it was lost.

Therefore, because the system is capable of reconstructing lost work, its use assures that any such loss is only temporary, not permanent as would otherwise be the case.

Operation—FIG. 5 (Details of Reconstruct Mode)

FIG. 5 is a flowchart that shows the operation of the system in its reconstruct mode. In this mode, the system automatically re-enters inputs that it previously stored as they were entered, and thereby automatically reconstructs work which was lost.

The system is automatically loaded from disk 44 to RAM 14 by start-up routine 30 (block 500). The system interrupts start-up routine 30 and, after initializing, searches for any lost work awaiting reconstruction by searching command file track 50 of disk 44 for the existence of one or more command files (block 502). Because such files are routinely purged when their related applications are normally and safely quit, the existence of any such file signals the existence of lost work awaiting reconstruction (block 510).

If the system discovers that any lost work is awaiting reconstruction (block 504), it switches to its reconstruct mode and notifies the operator by generating and showing a status report on video display 20 (block 508). For each item of lost work awaiting reconstruction, such report shows the identity of the application involved as stored in command file 50, and the number of relevant data keystrokes as stored by the system in data file 48. The report also shows the name of the work, if it was saved in a named file at any time before it was lost.

The following is an example of a typical report in a computer running under an operating system from Microsoft Corporation, sold under the trademark MS-DOS or MS-WINDOWS:

Application: MS-WORD
Work File: PATAPPN.DOC
Stored Keystrokes: 7168

In a computer running under an operating system from Apple Computer, Inc., provided under the trademark FINDER or MULTIFINDER, the work file in the example above could be named "PATENT APPN".

As described below, the operator can then make choices about the reconstruction of such lost work by interacting with dialog boxes provided by the system via video display 20 and keyboard 22 and/or mouse 24 and/or other input device 26 (block 520). The operator first selects the basic disposition of each item listed on the status report. A dialog box queries:

Abandon or Retain lost work? A(bandon) P(reserve)

If the operator chooses to abandon lost work, after confirmation, the system purges command file 50, data file 48, and interim buffer 46 (block 522). The system then shifts to store mode, start-up is completed, and normal operation resumes (block 572).

If the operator chooses to preserve the lost work for possible reconstruction, the contents of the last-written (fullest) cluster of interim buffer 46 are transferred to data file 48, and interim buffer 46 is purged (block 530).

Provided a decision is made to preserve the lost work, the operator may then select whether to reconstruct it immediately or to defer reconstruction until a later time (block 532). If the operator chooses to defer reconstruction, command file 50, data file 48, and any previously saved version of the lost work are retained (block 570). The system then shifts to store mode, start-up is completed, and normal operation resumes (block 572).

If the operator chooses to reconstruct lost work now, the system sets up a working area 38 in RAM 14 in which to reconstruct the lost work (block 534), and it then invokes the requisite application based on information stored in command file 50 (block 536). If any earlier version of the lost work was saved, its existence and name are similarly determinable by the system from command file 50 (block 538), and the system also loads it from disk 44 into working area 38 of RAM 14 (block 540).

The system then offers the operator a choice of three modes in which the lost work can be reconstructed as follows:

1. A free-run mode of reconstruction. This is the fastest mode. Here the entire contents of data file 48 are re-entered automatically in their original sequence and with appropriate timing and are processed as directed by the requisite application.

2. A stroke-by-stroke mode of reconstruction. Here the next characters stored in data file 48 are progressively shown in a dialog box on video display 20. The number of characters to be so displayed is selectable by the operator, and the operator disposes of each displayed character or symbol in one of the following ways by pressing an appropriate key on keyboard 22 or moving mouse 24 appropriately:

a. apply the next character to the work being reconstructed;

b. delete the next character so it will not be applied to the work being reconstructed; or c. apply any new keystroke of the operator's choice to the work being reconstructed before addressing the next character displayed in the dialog box.

For example, if the operator chose to display 35 characters, the dialog box would appear as follows:

Next 35 characters are: §↑T↓he☐↑Q↓uick☐↑B↓rown
   ↑F↓ox☐↑J↓ump
Ne☐xt character is: §
Press [Del] to delete: §
Re-position cursor to change insertion point
Press [Ins] to insert: § (at insertion point shown by blinking cursor)
Press any other key to insert its character before: §

3. A safeguard mode of reconstruction. This mode is useful when the work may have been lost owing to an input error, such as an unintended "delete". Here, reconstruction proceeds as in free-run mode until only "n" (as defined by the operator) characters remain to be re-entered and, from that point onward, reconstruction proceeds as in stroke-by-stroke mode.

The system then proceeds to reconstruct the lost work quickly, easily, reliably, completely, and automatically (block 542).

When reconstruction of any item of lost work is complete (block 544)), the system renames all of the constituent elements required to accomplish the reconstruction and retains them on disk 44 in the system's own directory as backup until the operator directs that they be deleted (block 546).

The names assigned by the system employ standardized extensions and are self-evident insofar as possible. Following the MS-DOS example given above of lost work originally named PATAPPN.DOC, the original file would be renamed PATAPPN.BAK, the command stroke file would be named PATAPPN.CSF and the data stroke file would be named PATAPPN.DSF. At the same time, the system assigns to the reconstructed work file the name which the operator had given to the work before it was lost, in the example just cited, that would be PATAPPN.DOC (block 548).

If no such name was given previously, the system requests the operator to provide one and, in the absence of an acceptable response, the system generates and arbitrarily assigns an identifiable name which is acceptable to computer 12 and its operating system 40, for example, in a computer running under MS-DOS or MS-WINDOWS, LOSTWRK3.DOC.

After an item of lost work has been successfully reconstructed, the system confirms that result in a report shown on video display 20 (block 550). The system also shows a report listing the identity and contents of all remaining command files 50, indicating additional items of lost work awaiting reconstruction, along with the sizes of all related data files 48 (block 552). Once again a dialog ensues between the system and the operator via a series of display screens which present questions and alternatives for response or selection by the operator.

Again, the operator then determines the disposition of each item listed on the report (block 560). With respect to each such item, the operator may again select any of three options discussed above.

When the reconstruct process directed by the system is complete or otherwise terminated, the system switches to its store mode as discussed above and returns control of the host computer to its start-up routine which then resumes normal operation (block 554).

When no lost work awaits reconstruction (block 504), or when reconstruction is complete (block 552), or when lost work is abandoned (block 520) or reconstruction is deferred (block 532), the system switches to its store mode, as shown in FIG. 4. Control of computer 12 is then returned to its start-up routine to proceed with normal operation (block 506).

CONCLUSION

It is thus seen that the system preserves work on an information processing device, such as a computer, and prevents it from being lost permanently even if it is erased from volatile memory or corrupted in consequence of power failure, equipment malfunction, operator error, or any other type of misadventure.

The system actually preserves and protects work on a computer from being permanently lost automatically, completely, reliably, and without disruption to the operator.

The system accomplishes this result very economically because it requires no special equipment of any kind, but simply modifies the functioning of basic hardware which is already present in information processing devices anyway.

The system functions without any need for operator intervention and, because it is completely transparent, it is totally non-disruptive to the operator's creative work.

Surprisingly, the system does not attempt to prevent the loss of work from volatile memory. Instead, the system accepts that such losses are occasionally inevitable, and it accepts that such occasional losses are tolerable provided they are only temporary. Therefore, rather than futilely attempting to prevent such losses absolutely, the system provides a method for assuring that any such losses as do occur are not permanent but only temporary. The system accomplishes this result by storing copies of the inputs that create work as they are entered and by providing a robust method of re-applying such stored input copies when they are needed to automatically and precisely reconstruct any work that is temporarily lost.

Several of the most salient aspects and advantages of the system are the following:

1. The system provides a means of storing to non-volatile memory on a real-time basis copies of all inputs to an information processing device that are needed to reconstruct lost work completely and accurately, including unformatted data, positional information, and data formatting and manipulating instructions.

2. The system provides a means of determining which of the inputs to such information processing device are substantive and, therefore, need to be stored immediately to non-volatile memory, and which are non-substantive and, therefore, need merely to be executed.

3. The system provides a means of determining if a substantive input string to be so stored invokes an application and, therefore, needs to be stored semi-permanently in a command file and not be purged until after all related work is finally saved and the operator confirms an intention to quit the application intentionally.

4. The system provides a means of determining if a substantive input string to be so stored is data (including unformatted data, positional information, data formatting instructions and data manipulating instructions) and, therefore, needs to be stored semi-permanently in a data file and not be purged until after the work product it generates has, itself, been saved to non-volatile memory.

5. The system provides a means of storing all substantive inputs from volatile memory to non-volatile memory continuously and virtually instantaneously so there is no discernible delay in, or disruption to, the operator's work.

6. The system provides a means of assuring that all inputs which modify work in volatile memory are stored to non-volatile memory essentially simultaneously so that when the system reconstructs lost work, it is reconstructed in its entirety.

7. The system provides a means of determining, when an information processing device is started up, whether lost work is awaiting reconstruction, and the system also provides a means of reporting the status of any lost work to the operator.

8. The system provides a means of automatically reconstructing lost work by re-entering stored inputs into an information processing device with appropriate timing as if they were being re-entered all over again manually.

9. The system provides an optional means of editing inputs that are being re-entered automatically into an information processing device in the process of reconstructing lost work so that, for example, flawed inputs that caused work to be lost in the first place, are not endlessly and automatically reiterated.

The fundamental innovation of the system derives from the surprising and unexpected recognition that to preserve computer work against possible loss it is not necessary to save an intact copy of the work itself. It is sufficient, in fact, merely to store copies of the inputs that create the work so it can be reconstructed automatically, and to then employ such stored copies automatically to reconstruct the work, if it should be lost in any way. The system achieves such result by storing to disk as it is entered into the computer each input needed to accomplish such reconstruction, and by providing a means for then re-applying such stored inputs automatically so as to reconstruct the lost work.

RAMIFICATIONS

Although the description above of the initially preferred embodiment of the system of the present invention (system) contains many specificities including references to computers, strokes, RAM, and disk, these should not be construed as limiting the scope of the invention but as merely providing illustrations of some of the presently preferred embodiments of the invention. It should be obvious that any functional substitutes for the exemplary devices would be equally appropriate.

For example, while the initially preferred embodiment of the system contemplates a computer capable of accepting manual inputs, any other input source is equally acceptable, and any type of computer is appropriate regardless of manufacturer (such as IBM, Compaq, Dell, Apple, Sun, etc.), processor type (such as Intel 80X86, Pentium, Motorola 680X0, Spare, Mips, etc.), or operating system (such as MS-DOS, UNIX, FINDER, etc.)

In lieu of a computer, any other type of device suitable for any type of information processing can be substituted, whether employed to generate any type of work product, or to control or otherwise mediate any other type of device in any way, or for any other purpose. Specific examples of such alternative devices include automatic teller devices, data collection devices, and store-and-forward nodes of digital information transmission systems, such as the so-called information superhighway.

In lieu of a keyboard, any other type of device can be substituted which is suitable for supplying any type of meaningful signals for input in any way to such information processing devices. Specific examples of such alternative devices include mice, scanners, modems, and bar-code readers.

In lieu of a conventional transistor-array dynamic RAM, any other type of volatile memory device can be substituted which is suitable for use in any way in conjunction with such information processing devices. Specific examples of such alternative devices include arrays of electronic vacuum tubes, electromechanical relays, ferrite cores, and bubble memories.

In lieu of conventional magnetic disk, any other type of non-volatile memory device can be substituted which is suitable for use in any way in conjunction with such information processing devices. Specific examples of such alternative devices include read-write optical disks and optical memory cards including those employing spectral-hole technology.

Numerous ramifications follow from the initially preferred embodiment of the system. With respect to the storing of strokes as entered, some of such ramifications relate to alternative forms and sources of strokes, alternative forms of volatile memory, alternative ways of manipulating strokes in volatile memory, alternative forms of non-volatile memory, alternative ways of manipulating non-volatile memory, and alternative timing patterns.

An entirely separate additional class of ramifications relates to alternative applications of the fundamental, novel, unobvious, and valuable innovative concepts that underlie the system.

In the initially preferred embodiment of the system, strokes are taken to be the result of manual manipulation of keys on a computer keyboard, but neither the source of a stroke nor the method of generating it are of its essence. For the system's purposes, a stroke is any input to a computer that has not previously been stored on machine-readable media of some type such that it can be re-entered automatically should unsaved work, and therefore the effect of the stroke, be lost in any way.

Although the result of manual depression or release of a key on a keyboard exemplifies a stroke in the initially preferred embodiment of the system, a stroke can have any number of alternate forms and sources which, whether available currently or not available until later, would be as suitable as the exemplified method for the system's purposes.

Other currently available sources of strokes include: a computer mouse, touch screen video display, an electronic stylus and electronic note pad, a bar code reader, an optical scanner, a magnetic ink character reader, a computer joystick, inputs received via a network, and inputs received via a modem, including a fax modem.

In the initially preferred embodiment of the system, non-volatile computer memory is referred to as disk, implying a hard disk drive that is not operationally removable from the computer. Disk implies a storage device employing one or more circular disks mounted on a spindle. Each disk has a non-flexible substrate coated on one or both sides with material capable of being magnetized permanently, but reversibly. The entire disk assembly is provided with an actuator device capable of being positioned with respect to specified locations on the disk and detecting, creating or eradicating magnetic domains at such specified locations.

The computer saves, stores, or writes information to memory on a disk by directing the actuator to create a specified pattern of magnetic domains at a specified location on the disk.

The computer retrieves or reads information from memory on a disk by interpreting the pulses generated in the actuator by the magnetic domains encountered by the actuator at a location on the disk specified by the computer.

Conceptually, the computer can erase, purge, or delete information from memory on a disk by directing the actuator to de-magnetize the domains at a specified location on the disk, but normally the same effect is achieved in practice in a different way: the name given to the batch of information (or file) that is to be deleted is deleted from the disk's directory (a sort of index). When the computer can no longer find the location of a file, it can no longer retrieve information from it, and the file is effectively erased.

Also, the file allocation table of the disk is modified to show that the disk clusters (locations) occupied by the information being deleted are no longer in use but are available for use. In due course, the computer then writes new information to such clusters and thereby overwrites and finally destroys the pattern of magnetic domains that formerly embodied the deleted information.

Although a disk exemplifies non-volatile memory in the initially preferred embodiment of the system, non-volatile memory can take any number of other forms which, whether available currently or not available until later, would be as suitable as the exemplified method for the system's purposes.

Other currently available forms of non-volatile memory include modular removable hard disk drives, removable floppy magnetic disks, magnetic memory cards, magnetic tapes, certain types of battery-sustained but otherwise volatile memory, certain types of optical memories, punched cards, and print-outs on paper or other media provided they can be retrieved by means of scanning and optical character recognition.

SCOPE OF INVENTION

Therefore, the full scope of the present invention should be determined by reference to the accompanying claims and their legal equivalents, rather than merely from the examples given.

We claim:

1. A system for preventing permanent loss of work product in process in an information processing system when said work product in process is temporarily lost owing to its unintended erasure or corruption, comprising:

a processing device, a manual input device, a non-volatile storage device, a volatile memory device, and a power source, said processing device being capable of receiving inputs from said manual input device and from said non-volatile storage device, of executing said inputs, of supplying said inputs and the results of their execution to work product in process in said volatile memory device, and of storing said inputs and said work product in process in said non-volatile storage device, said volatile memory device being capable of temporarily storing said inputs and the results of their execution as said work product in process, the contents of said volatile memory device being susceptible to accidental erasure or corruption in the event power thereto is interrupted and also in the event of equipment malfunction, operator error, or other misadventure, said non-volatile storage device being capable of permanently storing and retaining information so that said information is insusceptible to erasure or corruption in the event power thereto is interrupted or in the event said volatile memory device is accidentally erased or corrupted owing to any power interruption, equipment malfunction, operator error, or other misadventure, said manual input device being capable of entering substantive and non-substantive inputs into said volatile memory device through said processing device, said substantive inputs comprising application invocations, cursor locations, unformatted data, and data formatting and manipulating instructions affecting said work product in process, and said non-substantive inputs comprising instructions not affecting said work product in process, and therefore not essential to its reconstruction, said power source being capable of supplying power to said processing device, said volatile memory device, said non-volatile storage device, and said manual input device, and a storing means which automatically, immediately, and transparently, without any intrusion or delay discernible to an operator, sequentially stores all of said substantive inputs, but not any of said non-substantive inputs, in said non-volatile storage device, at the time said substantive inputs are entered into said processing device, but before they are executed or supplied to said volatile memory device, such that said non-volatile storage device will contain a sequential record of all of said substantive inputs destined to affect said work product in process substantially immediately after each said substantive input is entered into said processing device and before each is executed or supplied to said volatile memory device, whereby, in the event said work product in process in said volatile memory device is unintentionally erased or corrupted owing to any power interruption, equipment malfunction, operator error, or other misadventure, said work product in process, comprising fully manipulated and formatted data, can be reconstructed in its original form by re-entering said sequentially stored substantive inputs automatically and sequentially from said non-volatile storage device.

2. The system of claim 1 wherein said storing means includes means for distinguishing between said substantive and said non-substantive inputs.

3. The system of claim 2, further including a re-entering means for automatically re-entering said substantive inputs from said non-volatile storage device to said volatile memory device through said processing device and for thereupon executing or applying said re-entered inputs in the same manner and to the same end as said substantive inputs were initially entered manually into said volatile memory device.

4. The system of claim 3 wherein said re-entering means includes means for controlling the timing with which said substantive inputs are automatically re-entered into said volatile memory device through said processing device, such that said timing with which said substantive inputs are automatically re-entered emulates the timing with which said substantive inputs were initially entered manually into said volatile memory device through said processing device insofar as any time-dependent attributes of the operation of said processing device may require.

5. The system of claim 3 wherein said re-entering means also includes means for re-invoking any application program under which said work product in process was being created or modified when it was temporarily lost.

6. The system of claim 3 wherein said re-entering means also includes means for empowering an operator of said computer to selectively accept, modify, edit, or delete any of said substantive inputs after they are automatically re-entered but before they are executed or applied in the process of reconstructing said work product in process.

7. The system of claim 1 wherein said information processing system is a computer and wherein:

said processing device is a computing device comprising an information processing device, said volatile memory device is a read-and-write random access memory device, said non-volatile storage device is a read-and-write disk-type storage device, and said manual input device is a device selected from the class consisting of keyboards, mice, joysticks, touch-screens, electronic styli and pads, scanners, modems, and network interfaces.

8. The system of claim 7 wherein said storing means includes a non-delay means for causing said volatile memory device and said non-volatile storage device to operate transparently together, thereby avoiding any discernible disruption or delay to an operator of said computer owing to any cylinder-seek or cluster-seek operation of said non-volatile storage device.

9. The system of claim 8 wherein said non-delay means includes a pair of accumulating buffers in said volatile memory device, such that while either one of said accumulating buffers is accumulating said substantive inputs as they are entered, the contents of the other of said accumulating buffers are being stored permanently in said non-volatile storage device.

10. The system of claim 9 wherein said non-delay means also includes a pair of counterpart buffer arrays in said non-volatile storage device, each of said counterpart buffer arrays corresponding to one of said accumulating buffers in said volatile memory device, said non-volatile storage device having a plurality of cylinders, each of said cylinders having a plurality of storage tracks, each of said storage tracks having a plurality of clusters, each of said counterpart buffer arrays comprising all of the clusters of one complete storage track situated on a single cylinder of said non-volatile storage device, thereby to provide a pair of counterpart buffer array storage tracks, and both of said counterpart buffer array storage tracks being situated on the same single cylinder of said non-volatile storage device.

11. The system of claim 10 wherein said non-volatile storage device has an actuator which defaults to said single specified cylinder, the contents of said accumulating buffer are stored continuously to the next accessible cluster of said counterpart buffer array before said contents are executed or applied, thereby affecting said work product in process, whereby said volatile memory device and said non-volatile storage device operate transparently together in a manner which obviates any discernible delay owing to cylinder-seek or cluster-seek operation of said non-volatile storage device, thereby enabling said substantive inputs to be stored from said volatile memory device to said non-volatile storage device automatically, immediately, completely, reliably, and without any discernible disruption or delay to said operator of said computer.

12. A method for preventing permanent loss of work product in process in an information processing system when said work product in process is temporarily lost owing to its unintended erasure or corruption, comprising:

providing a processing device, a manual input device, a non-volatile storage device, a volatile memory device, and a power source, said processing device being capable of receiving inputs from said manual input device and from said non-volatile storage device, of executing said inputs, of supplying said inputs and the results of their execution to work product in process in said volatile memory device, and of storing said inputs and said work product in process in said non-volatile storage device, said volatile memory device being capable of temporarily storing entered inputs and their products while they in process, the contents of said volatile memory device being susceptible to accidental erasure or corruption in the event power thereto is interrupted and also in the event of equipment malfunction, operator error, or other misadventure, said non-volatile storage device being capable of permanently storing and retaining information so that said information is insusceptible to erasure or corruption in the event power thereto is interrupted or in the event said volatile memory device is accidentally erased or corrupted owing to any power interruption, equipment malfunction, operator error or other misadventure, said manual input device being capable of entering substantive and non-substantive inputs into said volatile memory device through said processing device, said substantive inputs comprising application invocations, cursor locations, unformatted data, and data formatting and manipulating instructions affecting said work product in process, and said non-substantive inputs comprising instructions not affecting said work product in process, and therefore not essential to its reconstruction, said power source being capable of supplying power to said processing device, said volatile memory device, said non-volatile storage device, and said manual input device, and automatically, immediately, and transparently, without any intrusion or delay discernible to an operator, sequentially storing all of said substantive inputs, but not any of said non-substantive inputs, in said non-volatile storage device, at the time said substantive inputs are entered into said processing device but before they are executed or supplied to said volatile memory device, such that said non-volatile storage device will contain a sequential record of all said substantive inputs destined to affect said work product in process substantially immediately after each said substantive input is entered into said processing device and before each is executed or supplied to said volatile memory device, whereby, in the event said work product in process in said volatile memory device is unintentionally erased or corrupted owing to any power interruption, equipment malfunction, operator error, or other misadventure, said work product in process, comprising fully manipulated and formatted data, can be reconstructed in its original form by re-entering said sequentially stored substantive inputs automatically and sequentially from said non-volatile storage device.

13. The method of claim 12 further including distinguishing between said substantive and said non-substantive inputs.

14. The method of claim 12 wherein said information processing system is a computer and wherein:

said processing device is a computing device comprising an information processing device, said volatile memory device is a read-and-write random access memory device, said non-volatile storage device is a read-and-write disk-type storage device, and said manual input device is a device selected from the class consisting of keyboards, mice, joysticks, touch-screens, electronic styli and pads, scanners, modems, and network interfaces.

15. The method of claim 14, further including causing said volatile memory device and said non-volatile storage device to operate transparently together, thereby avoiding any discernible disruption or delay to an operator of said computer owing to any cylinder-seek or cluster-seek operation of said non-volatile storage device.

16. The method of claim 15, further including providing a pair of accumulating buffers in said volatile memory device, such that while either one of said accumulating buffers is accumulating said substantive inputs as they are entered, the contents of the other of said accumulating buffers are being stored permanently in said non-volatile storage device.

17. The method of claim 10, further including providing a pair of counterpart buffer arrays in said non-volatile storage device, each of said counterpart buffer arrays corresponding to one of said accumulating buffers in said volatile memory device, said non-volatile storage device having a plurality of cylinders, each of said cylinders having a plurality of storage tracks, each of said storage tracks having a plurality of clusters, each of said counterpart buffer arrays comprising all of the clusters of one complete storage track situated on a single cylinder of said non-volatile storage device, thereby to provide a pair of counterpart buffer array storage tracks, and both of said counterpart buffer array storage tracks being situated on the same single cylinder of said non-volatile storage device.

18. The method of claim 17 wherein said non-volatile storage device has an actuator which defaults to said single specified cylinder, the contents of said accumulating buffer are stored continuously to the next accessible cluster of said counterpart buffer array before said contents are executed or applied, whereby said volatile memory device and said non-volatile storage device operate transparently together in a manner which obviates any discernible delay owing to cylinder-seek or cluster-seek operation of said non-volatile storage device, thereby enabling said substantive inputs to be stored from said volatile memory device to said non-volatile storage device automatically, immediately, completely, reliably, and without any discernible disruption or delay to said operator of said computer.

19. The method of claim 12, further including automatically re-entering said substantive inputs from said non-volatile storage device to said volatile memory device through said processing device and thereupon executing or applying said re-entered inputs in the same manner and to the same end as said substantive inputs were initially entered manually into said volatile memory device.

20. The method of claim 19, further including controlling the timing with which said substantive inputs are automatically re-entered into said volatile memory device through said processing device, such that said timing with which said substantive inputs are automatically re-entered emulates the timing with which said substantive inputs were initially entered manually into said volatile memory device through said processing device insofar as any time-dependent attributes of the operation of said computer may require.

21. The method of claim 19, further including re-invoking any application program under which said work product in process was being created or modified when it was temporarily lost.

22. The method of claim 19, further including empowering an operator of said computer to selectively accept, modify, edit, or delete any of said substantive inputs after they are automatically re-entered, but before they are executed or applied in the process of reconstructing said work product in process.

* * * * *